US008849826B2

(12) United States Patent
Minh

(10) Patent No.: US 8,849,826 B2
(45) Date of Patent: Sep. 30, 2014

(54) SENTIMENT ANALYSIS FROM SOCIAL MEDIA CONTENT

(71) Applicant: Metavana, Inc., San Francisco, CA (US)

(72) Inventor: Duong-Van Minh, San Diego, CA (US)

(73) Assignee: Metavana, Inc., San Francisco, CA (US)

( * ) Notice: Subject to any disclaimer, the term of this patent is extended or adjusted under 35 U.S.C. 154(b) by 0 days.

(21) Appl. No.: 13/632,011

(22) Filed: Sep. 30, 2012

(65) Prior Publication Data

US 2013/0091117 A1 Apr. 11, 2013

Related U.S. Application Data

(60) Provisional application No. 61/541,627, filed on Sep. 30, 2011.

(51) Int. Cl.
*G06F 17/30* (2006.01)

(52) U.S. Cl.
CPC .... *G06F 17/30864* (2013.01); *G06F 17/30707* (2013.01)
USPC ............................ 707/737; 707/709; 707/738

(58) Field of Classification Search
USPC ......................................... 707/709, 737, 738
See application file for complete search history.

(56) References Cited

U.S. PATENT DOCUMENTS

| 2008/0133488 | A1 | 6/2008 | Bandaru et al. |
| 2009/0319342 | A1 | 12/2009 | Shilman et al. |
| 2010/0174726 | A1 | 7/2010 | Nance et al. |
| 2010/0262597 | A1 | 10/2010 | Han |
| 2011/0041080 | A1 | 2/2011 | Fleischman et al. |
| 2011/0161071 | A1 | 6/2011 | Duong-Van |
| 2012/0278064 | A1* | 11/2012 | Leary et al. ........................ 704/9 |
| 2013/0041884 | A1* | 2/2013 | Nomula .......................... 707/710 |
| 2013/0073336 | A1* | 3/2013 | Heath .......................... 705/7.29 |

FOREIGN PATENT DOCUMENTS

KR 10-2009-0068803 6/2009

OTHER PUBLICATIONS

Mukund et al. "BI and Sentiment Analysis", Business Intelligence Journal vol. 15, No. 2, Jun. 3, 2010.*
International Search Report dated Mar. 18, 2013 corresponding to PCT/US12/58193.
Metavana, Inc. et al; PCT/US2012/058193 filed on Sep. 30, 2012; International Preliminary Report on Patentability; mailed Apr. 1, 2014; The International Bureau of WIPO; 8 pages.

* cited by examiner

*Primary Examiner* — Etienne Leroux
*Assistant Examiner* — Cindy Nguyen
(74) *Attorney, Agent, or Firm* — Dentons US LLP

(57) ABSTRACT

The sentiment engine includes a sentiment module configured to gather opinions or determine sentiment expressed in documents, a crawling module configured to crawl servers to obtain at least a subset of the documents or opinions from social media websites, a keyword module configured to extract keywords from documents, a filtering module configured to filter keywords and documents, and a classification module configured to classify documents, sentences, and/or keywords, a polarity prediction module configured to predict the polarity of a sentiment sentence, and a social media net promoter score (SNPS) configured to calculate a loyalty metric of users from social media websites. The functionality of these modules may be combined with one another or in addition to other modules.

16 Claims, 13 Drawing Sheets

$c2 = 1298.0135 + 399.55958*c0 - 315.29957*c0^2 - 157.78*c0^3 + 16.26*c0^4 + 20.64*c0^5 + 1.70*c0^6 - 0.93*c0^7 - 0.14*c0^8 + 0.010*c0^9 + 0.0024*c0^{10}$ $Y = 1298.0135 + 399.55958*X - 315.29957*X^2 - 157.78*X^3 + 16.26*X^4 + 20.64*X^5 + 1.70*X^6 - 0.93*X^7 - 0.14*X^8 + 0.010*X^9 + 0.0024*X^{10}$

| SCORE | LOGISTIC | SCORE | HISTOGRAM |
|---|---|---|---|
| -10.0 | 0.992 | -10.0 | 3.00 |
| -6.00 | 0.990 | -6.00 | 1.00 |
| -3.00 | 0.965 | -3.00 | 9.00 |
| -2.00 | 0.868 | -2.00 | 29.0 |
| -1.00 | 0.527 | -1.00 | 106 |
| 1.00 | -0.0987 | 1.00 | 141 |
| 2.00 | -0.620 | 2.00 | 65.0 |
| 3.00 | -0.873 | 3.00 | 35.0 |
| 10.0 | -0.977 | 10.0 | 6.00 |

FIG. 8E

The results of the Customer Service Sentiment Engine will be displayed in two focuses:

1. Histogram: Number of reviews having a Metavana score s is N(S)
   There will be an index for each review, then $N_i(S_i)$

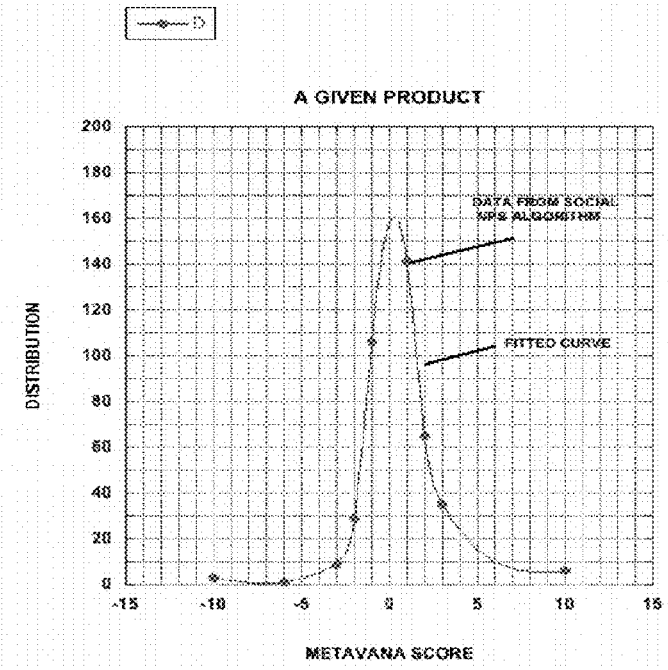

FIG. 8F

The NPS score can be extracted from the logistic curve $L_k(S_k)$ $$L_k(S_k) = \frac{\sum_i^{N_{max}} \sum_{k=i+1}^{N_{max}-1} - \sum_i^{N_{min}} \sum_{k=i-1}^{N_{min}-1} N_k(S_k)}{\sum_i^{N_{tot}} N_i(S_i)}$$

The plot of $L_k(S_k)$ is called the logistic curve below.

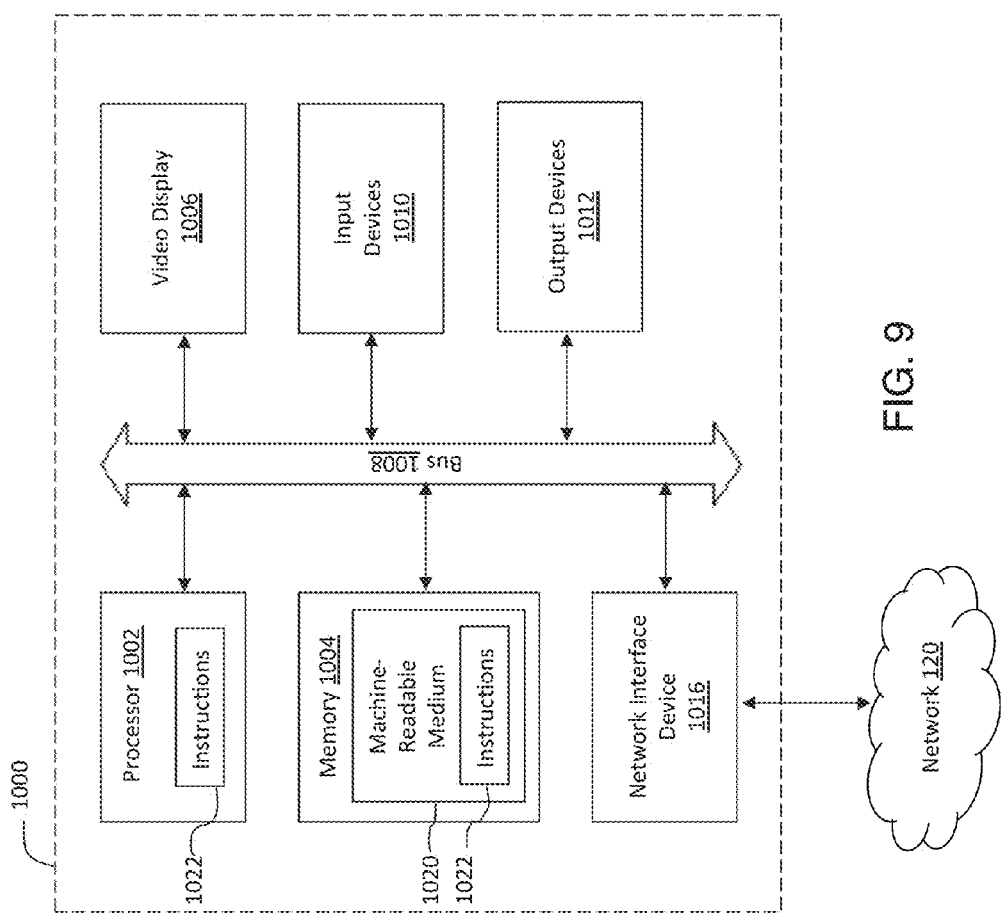

SENTIMENT ANALYSIS FROM SOCIAL MEDIA CONTENT

CROSS REFERENCES TO RELATED PATENT APPLICATIONS

This application claims priority to U.S. Provisional Application Ser. No. 61/541,627 entitled "Sentiment Analysis from Social Media Content," filed on 30 Sep. 2011, the disclosure of which is incorporated herein by reference in its entirety.

TECHNICAL FIELD

The present invention relates generally to social networking technologies, and more particularly to method for determining sentiment expressed in documents from social network content.

BACKGROUND ART

The Internet includes information on various subjects. This information may be written by experts in a particular field or casual users (e.g., bloggers, reviewers, etc.). Search engines allow users to identify documents including information on subjects of interest for the users. However, it is presently difficult to identify sentiment expressed by these users on particular subjects (e.g., the quality of rooms at a particular hotel).

The ease of publishing content on social media sites brings to the web an ever increasing amount of content about products, people, hotels, events, and others. Sites like amazon.com and bestbuy.com provide invaluable content about how people think about the product they purchased and have been using. Similarly sites like yelp.com and tripAdvisor.com provide vast amount of user opinion on the places and restaurants. Further blogs, micro-blogging sites like twitter.com, social networking sites like facebook.com provide even richer content on user opinions on different subjects, real world objects, places, etc. As a result, the number of social media content that is related to the topic (i.e., product, hotel, etc.) grows rapidly. Furthermore, many reviews (or social media content) are long and contain only limited amount of opinion bearing sentences. This makes it hard for a potential customer or service provider to make an informed decision based on the social media content.

Accordingly, it is desirable to provide a summarization technique, which provides opinion bearing information about different categories of a selected product, or hotel, or service.

SUMMARY OF THE INVENTION

Embodiments of the present invention provide a system, method, and article of manufacture that employs a sentiment engine for aggregating contents from different social media websites and to extract opinions on different categories, which includes services, products or hotels, and others, collectively referred to as "the keyword product". The sentiment engine includes a sentiment module configured to gather opinions or determine sentiment expressed in documents, a crawling module configured to crawl servers to obtain at least a subset of the documents or opinions from social media websites, a keyword module configured to extract keywords from documents, a filtering module configured to filter keywords and documents, and a classification module configured to classify documents, sentences, and/or keywords, a polarity prediction module configured to predict the polarity of a sentiment sentence, and a social media net promoter score (SNPS) configured to calculate a loyalty metric of users from social media websites. The functionality of these modules may be combined with one another or in addition to other modules.

Broadly stated, a computer-implemented method for sentiment analysis from social media content comprises crawling, by a processor, a plurality of websites to obtain metadata from social media content; extracting, by a processor, the metadata from the social media content by identifying a polarity of the sentiment-bearing keywords in a sentence from social media content using a phase transition formula; determining at least one category corresponding to the at least one sentiment-bearing keyword of the sentence; and determining at least one sentiment corresponding to the at least one category based on the at least one sentiment-bearing keyword.

The structures and methods of the present invention are disclosed in the detailed description below. This summary does not purport to define the invention. The invention is defined by the claims. These and other embodiments, features, aspects, and advantages of the invention will become better understood with regard to the following description, appended claims and accompanying drawings.

BRIEF DESCRIPTION OF THE DRAWINGS

The invention will be described with respect to specific embodiments thereof, and reference will be made to the drawings, in which:

FIGS. 8A-8G illustrate sampling graph curves of scores and logistic distributions in accordance with the present invention.

FIG. 9 is a block diagram of a machine in accordance with the present invention.

DETAILED DESCRIPTION

Figure 1:
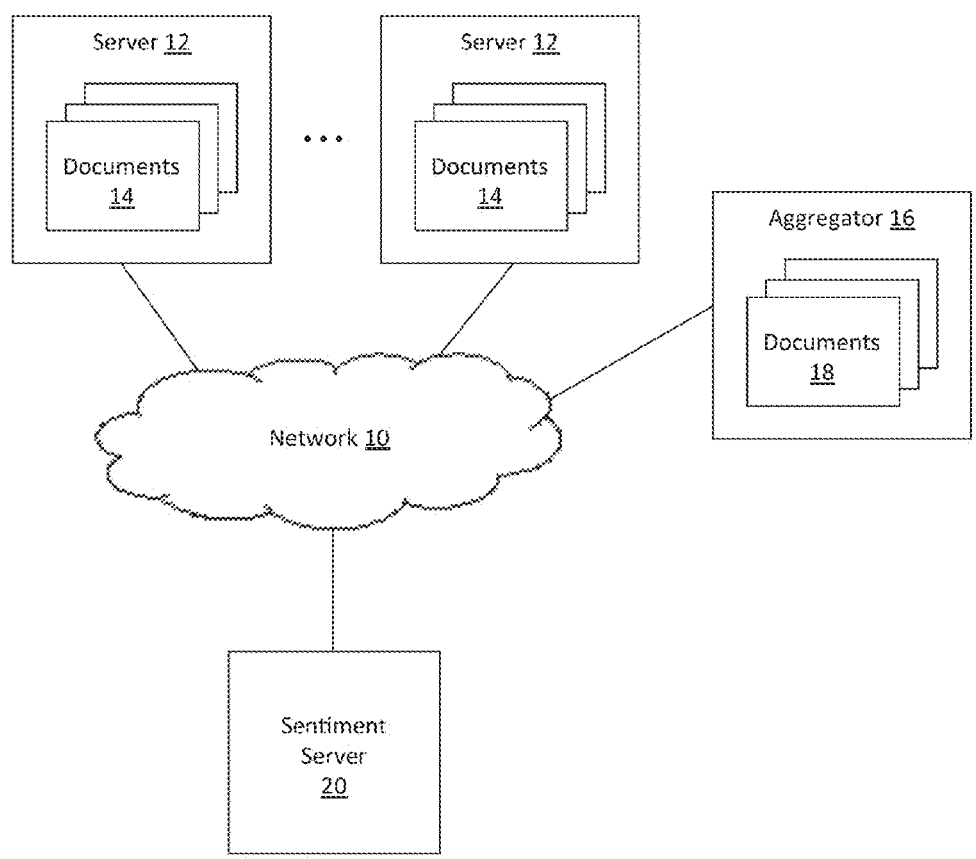
FIG. 1 is a block diagram illustrating an exemplary network in accordance with the present invention.

A description of structural embodiments and methods of the present invention is provided with reference to FIGS. 1-9. It is to be understood that there is no intention to limit the invention to the specifically disclosed embodiments but that the invention may be practiced using other features, elements, methods and embodiments. Like elements in various embodiments are commonly referred to with like reference numerals. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

FIG. 1 is a block diagram illustrating a network 10 according to some embodiments. The network 10 can generally include any type of wired or wireless communication channel capable of coupling together computing nodes. This includes, but is not limited to, a local area network, a wide area network, or a combination of networks. In some embodiments, network 10 includes the Internet. In some embodiments, a server 12 is coupled to the network 10. The server 12 may include documents 14. The documents 14 may be any type of document, including, but not limited to, a web document (e.g., hypertext markup language (HTML) document, an extensible markup language (XML) document, etc.), a text document, a spreadsheet, a presentation, a scanned document (e.g., scanned text, etc.), an image, and the like.

In some embodiments, an aggregator 16 is coupled to the network 10. The aggregator 16 may include documents 18. In some embodiments, the aggregator 16 obtains at least a subset of the documents 14 from the servers 12. For example, the aggregator 16 may crawl the servers 12 and retrieve at least a subset of the documents 14 from the servers 12.

In some embodiments, a sentiment server 20 is coupled to the network 10. The sentiment server 20 is configured to determine sentiment expressed in documents, as described herein. The documents used by the sentiment server 20 may include documents obtained from the servers 12 (e.g., by crawling the servers 12, documents obtained from the aggregator 16 (e.g., by purchasing documents from the aggregator 16, or a combination thereof.

Figure 2:
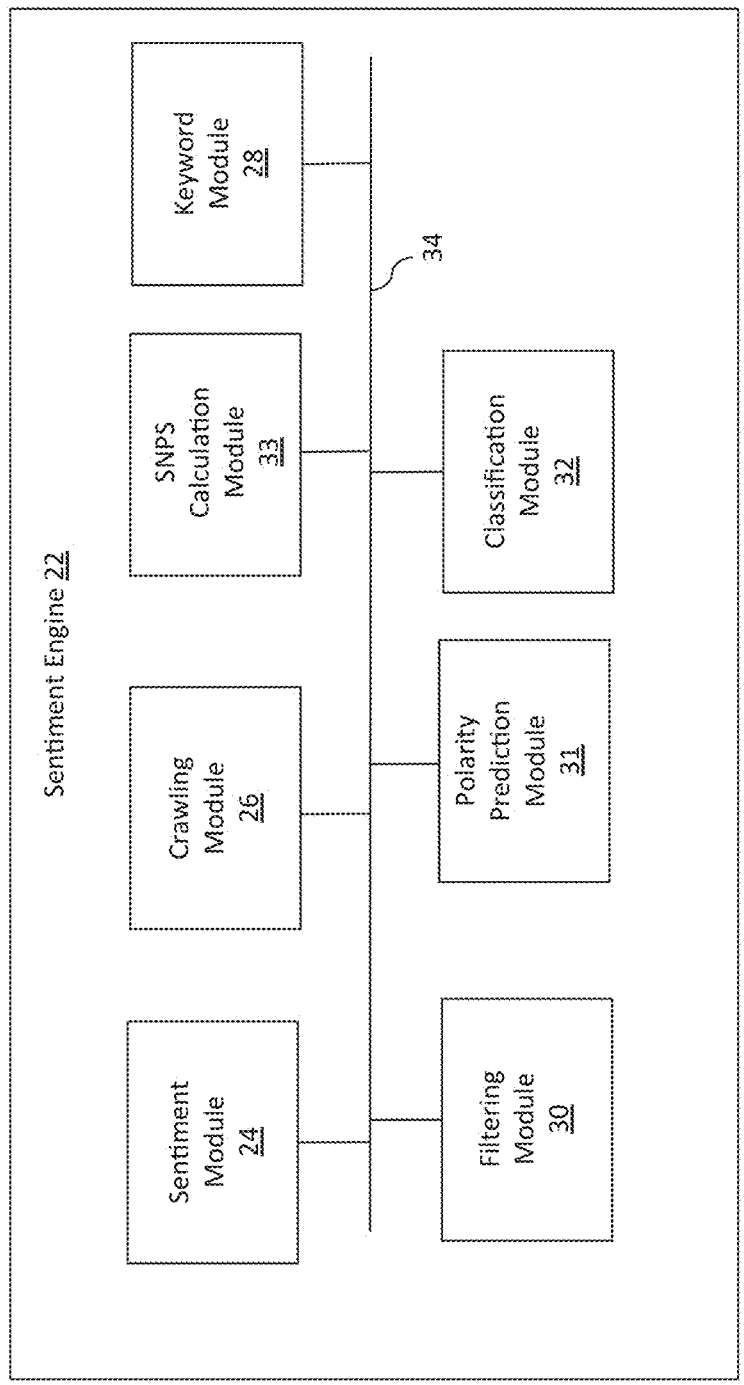
FIG. 2 is a block diagram illustrating a sentiment engine in the sentiment server in accordance with the present invention.

FIG. 2 is a block diagram illustrating a sentiment engine 22 which resides in the sentiment server in accordance with some embodiments. The sentiment engine 22 includes a sentiment module 24 configured to gather opinions or determine sentiment expressed in documents, a crawling module 26 configured to crawl servers 12 to obtain at least a subset of the documents or opinions from social media websites 14, a keyword module 28 configured to extract keywords from documents, a filtering module 30 configured to filter keywords and documents, and a classification module 32 configured to classify documents, sentences, and/or keywords, a polarity prediction module 31 configured to predict the polarity of a sentiment sentence, and a social media net promoter score (SNPS) configured to calculate a loyalty metric of users from social media websites. The functionality of these modules may be combined with one another or in addition to other modules. For example, the sentiment module 24 may include the functionality of the keyword module 28 and the filtering module 30. The sentiment module 24, the crawling module 26, the keyword module 28, the filtering module 30, and the classification module 32 are coupled to a communication bus 34.

For additional information on determining sentiment expressed in documents, see U.S. patent application Ser. No. 12/977,513 entitled "System and Method for Determining Sentiment Expressed in Documents", filed on Dec. 23, 2012, owned by the assignee of this application and incorporated by reference as if fully set forth herein.

Figure 3:
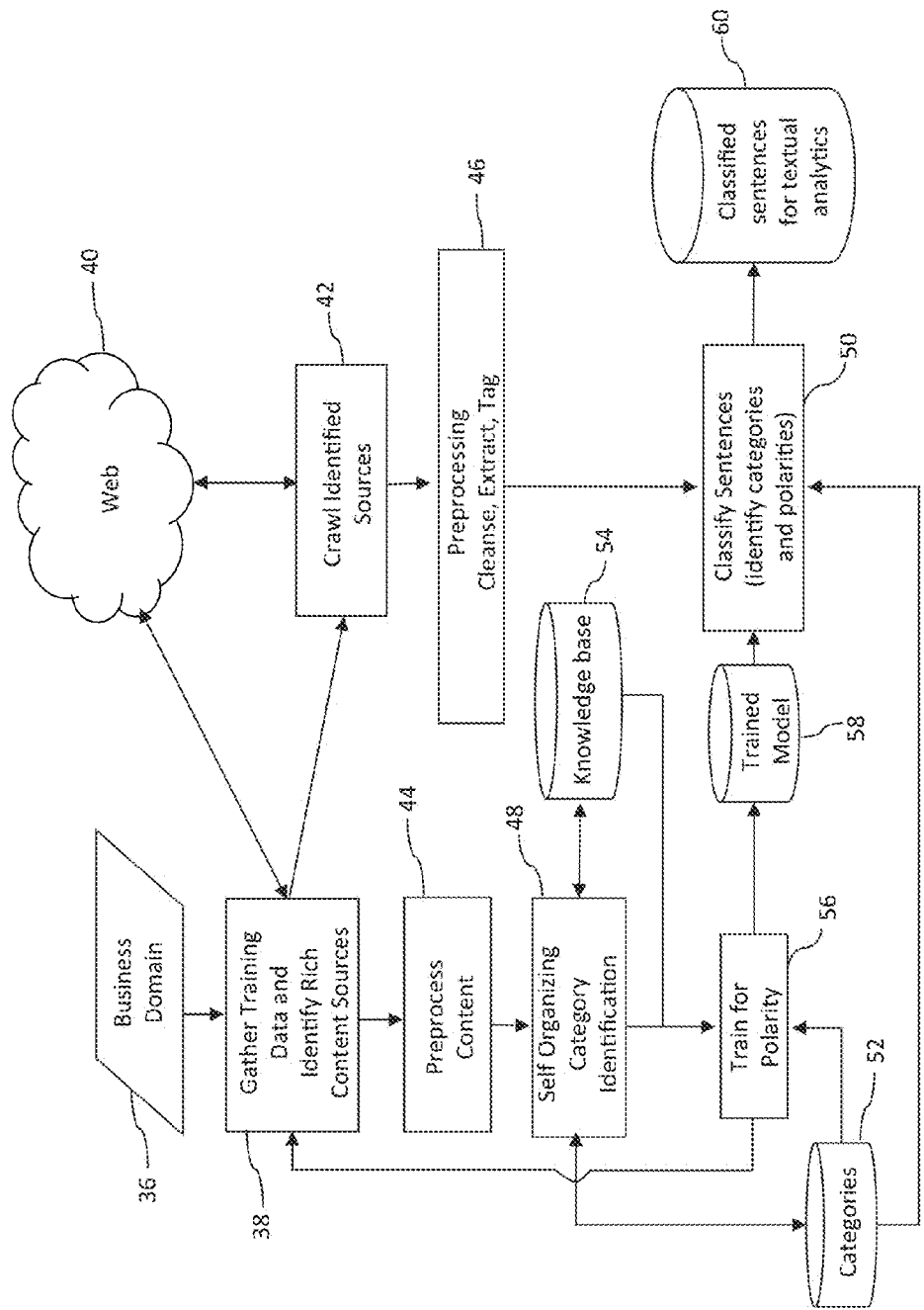
FIG. 3 is software system diagram illustrating the general architecture of sentiment analysis from social media content in accordance with the present invention.

FIG. 3 is software system diagram illustrating the general architecture of sentiment analysis from social media content. In a business domain 36, such as a product or service, at step 38, the sentiment engine 22 is configured to gather training data and identify rich data sources by obtaining information through one or more web sites 40, such as social network sites, facebook.com, linkedin.com, twitter.com, www.amazon.com, yelp.com, bestbuy.com. tripadvisor.com, and flyertalk.com. After these data sources are identified, the sentiment engine is configured to implement focused crawlers for the identified social network sites at step 42. After crawlers are customized, content of the related web pages along with the associated metadata are collected. At steps 44 and 46, respectively, the sentiment engine 22 is configured to preprocess the content by applying stop-word removal. In one embodiment, the most frequent n-grams are identified. At steps 48 and 50, respectively, these keywords are then used to identify categories. Alternatively, the different categories can be supplied from a source like categories 52, as well as obtaining update from the self organizing category identification 48. A knowledge database 54 also interacts with the self organization category identification 48 is receiving and updating category identification.

Identified categories and opinion bearing keywords are then used to train the sentiment engine 22 for each different category. At step 56, the sentiment engine 22 is configured to conduct training separately for each category as the same opinion bearing keyword (i.e., adjective, adverb, etc.) that might have different polarities based on a particular category. For instance, while low price is a positive sentiment for the Price category, low quality is a negative sentiment for the quality category. Therefore, category keywords and category adjectives should be used in training.

A trained model 58 is then used to classify sentences into categories with their sentiments. At step 60, the output of sentiment engine 22 generates an output of classified sentences for textual analytics to create summaries about the features for each different product. An illustrative example of such summary is show in Table 1, which provides a sample summary of sentiments for the print quality category of the printer product printer_type_1.

TABLE 1

Figure 4:
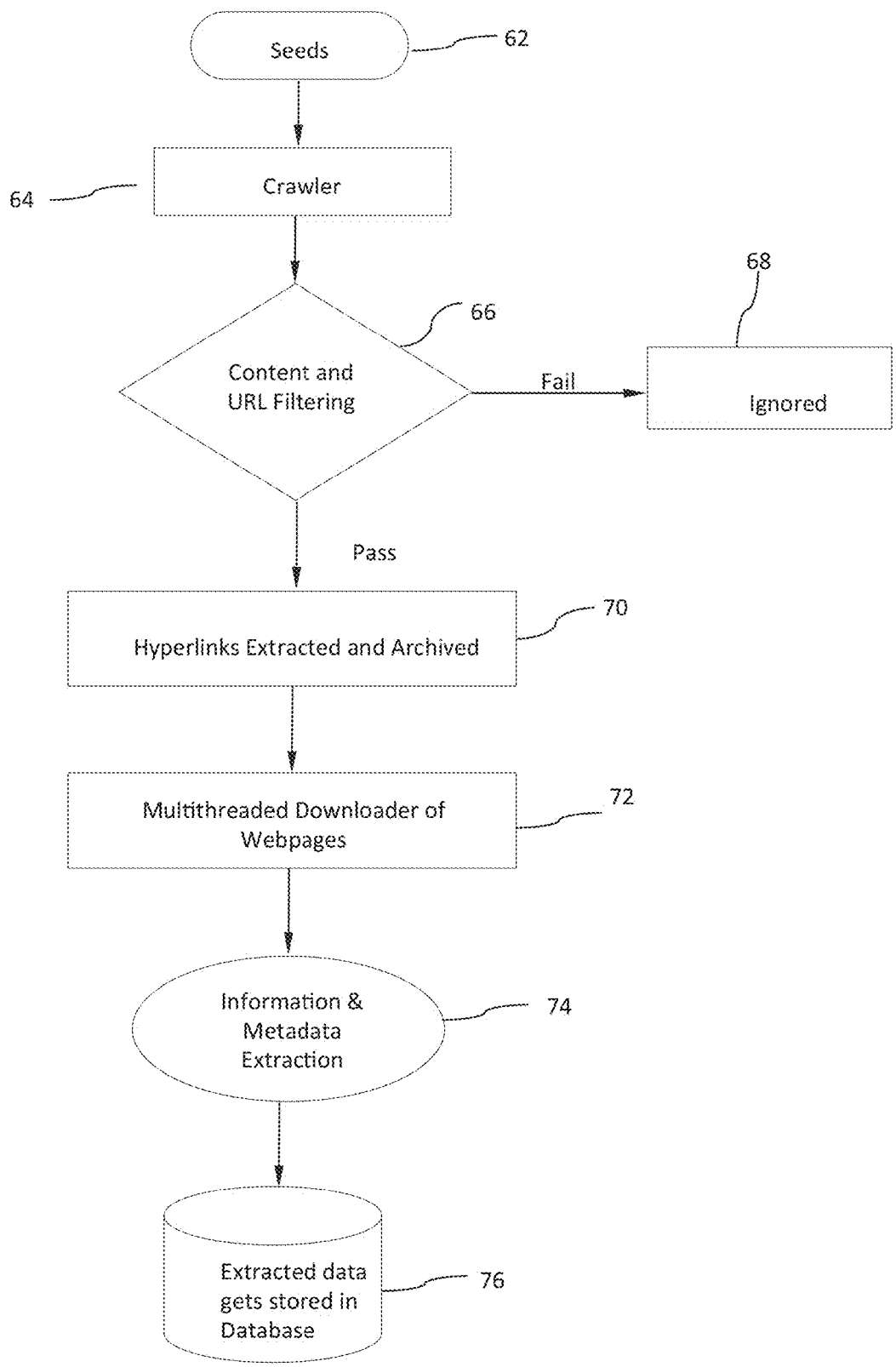
FIG. 4 is a flow chart that illustrates the process of web crawling for keyword identification and category identification in accordance with the present invention.

Printer_type_1
Category: Print Quality
Positive: <243>
   Individual Sentences
Negative: <35>
   Individual Sentences FIG. 4 is a flow chart that illustrates the process of web crawling for keyword identification and category identification. The crawling module 26 does an extensive crawling on different websites available on the World Wide Web (WWW). The crawling module 26 is designed and developed in a way that it has additional capabilities like fetching and extracting metadata of the information from the websites and subsequently archiving in the database. In one embodiment, the crawling module 26 parses the specific websites and in that specific web pages from where relevant information is obtained. In this embodiment, the crawling module 26 uses a top-down approach. At step 62, the crawling module 26 is configured to start from a seed node (a web page of the website from where the web crawling 26 starts crawling) and extracts all the hyperlinks from the web page at step 64. At step 66, the filtering module 30 is configured to determine the content of a web page and uses the URL filter. If the result is negative, the failed web pages are ignored at step 68. If the web pages pass the URL filter, the sentiment engine 22 is configured to archive the related hyperlinks at step 70. Next, the crawling module 26 is configured to go to each and every hyperlink one by one and repeat the whole process of extraction and archive. In this process of extraction, the crawler module 26 may encounter specific web pages, which are related to a select topic for which these web pages are to be downloaded, and the web pages are downloaded simultaneously at step 72.

A focused crawler may download web pages that are relevant to a particular topic and avoid downloading all others. Thus, seed URLs can be significant in the web crawler module 26.

In focused crawler, one of our main requirements is to halt the webpages, which are not relevant to the search, from being downloaded. To conceive this target, the crawling module 26 uses the URL and content filters. Regular expressions for URL filtering may be utilized. The crawling module 26 specifies the program as to which type of URL to parse and which type of URL to ignore. The use of content filter is optional, which can be activated or deactivated. Optionally, some content may be specified like keywords in the program. At step 74, the filter module 30 checks the content of the retrieved web page and if there is any content, which is relevant to the search, the relevant web pages are saved while the irrelevant ones are discarded.

The level of depth search in our program can be specified. When the crawling module 26 parses any web page, the crawling module 26 extracts the links and archives in any temporary data structure at step 76. The crawling module 26 parses the links stored in that temporary data structure and does the same for these webpages. In this embodiment, if the sentiment engine 22 assigns the depth level to 1, the crawling module 26 will only go to the second level from the root page. If the sentiment engine 22 assigns the depth level to −1, the crawling module 26 will go to the end of the tree, which means the last webpage in that directory of website.

Web crawlers like the crawling module 26 have to identify themselves to the web server of the website which they are crawling. The sentiment engine 22 uses the User Agent field of an HTTP request. The company information is placed in the User Agent field so that the administrator of the webserver can learn about the identity of the Web crawlers.

Figure 5:
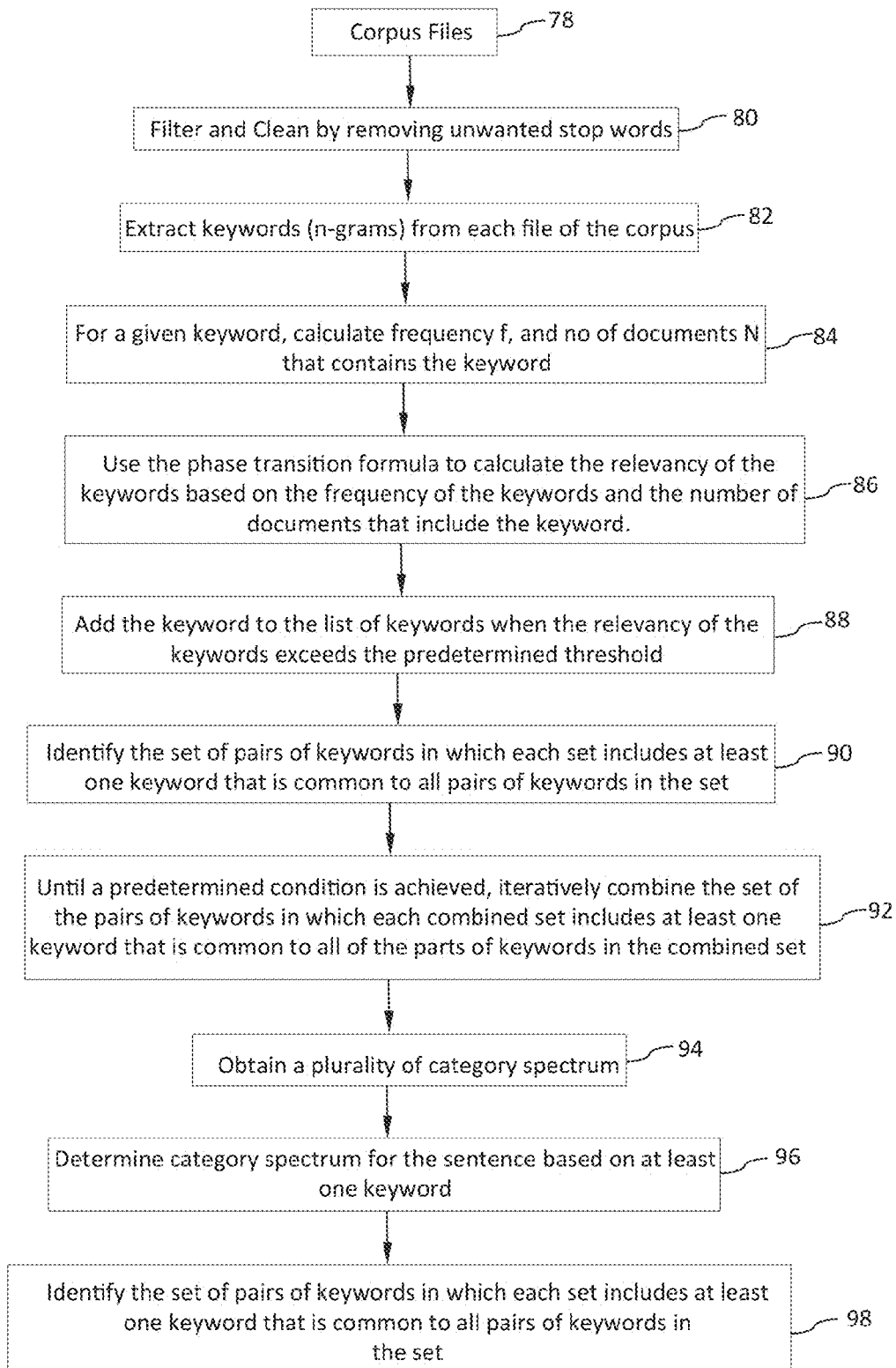
FIG. 5 is a flow diagram illustrating the process of extracting, categorizing, and identifying keywords in accordance with the present invention.

FIG. 5 is a flow diagram illustrating the process of extracting, categorizing, and identifying keywords. The data files extracted through the process in FIG. 3 are preprocessed for Keyword extraction. This process is used to identify categories and opinion bearing keywords, which are then used to train the sentiment engine 22. The process of keyword extraction is as explained in FIG. 4.

The sentiment engine 22 retrieves corpus files at step 78, and filter and clean the files by removing unwanted stop words 80. At step 82, the keyword extraction module 28 is configured to extract keywords from each document file of the plurality of documents. For each keyword, at step 84, the keyword module 28 calculates the frequency, f, of the keyword in the plurality of the documents and a number of documents, N, that includes the keyword. Next, at step 86, the keyword extraction module 28 uses a phase transition formula to calculate the relevancy of the keyword based on the frequency of the keyword in the plurality of documents and the number of documents that include the keyword. The phase transition formula is $$\frac{f}{N^x},$$

where x≥1. In some embodiments, x can be a different number, such as 3. At step 88, the keyword module 28 is configured to add the keyword to the list of keywords when the relevancy of the keyword exceeds a predetermined threshold.

At step 90, the classification module 32 is configured to determine pairs of keywords in the list of keywords that are related to each other, wherein the pairs of keywords are unique pairs of keywords. For instance, for the corpus having m files with n keywords, each $n^{th}$ keyword from $m^{th}$ file is matched against (m−1) files thus forming different clusters. Keywords belonging to each cluster are believed to belong to the same domain. Such clusters obtained through this process are later on refined and named as categories. Next, the classification module identifies sets of pairs of the keywords in which each set includes at least one keyword that is common to all of the pairs of keywords in the set.

At step 92, until a predetermined termination condition is achieved, the classification module 32 then is configured to iteratively combine the sets of the pairs of keywords in which each combined set. Thus, the classification module 32 determines set of keywords that are related to each other and iteratively combines the pairs to form the categories. For example, the classification module 32 may identify the following pairs of keywords from the list of keywords. {Paris, Romance}, {Paris, City of Love}, {Paris, French}, {Dog, Beagle}, {Cat, Siamese}. The classification module 32 may then determine that {Paris, Romance, City of Love, French} is a set of related keywords (e.g., a category) because the word "Paris" is common to the pairs {Pairs, Romance}, {Paris, City of Love}, {Paris, French}. Note that the classification module 32 may also determine that {Paris, Romance, City of Love} is a set of related keywords. The level of specificity desired for a category determines the predetermined termination condition. The more keywords that are used to describe the category, the more specific the category is (e.g., {Paris, Romance, City of Love, French} is more specific than {Paris, Romance, City of Love}). At step 94, the classification module 32 is configured to then calculate dot products of the category spectrums. At step 96, the classification module 32 then determines at least one dot product that exceeds a predetermined threshold. Note that a category spectrum may be represented by the pair {WordID, Frequency}, where the value of WordID corresponds to a unique keyword and Frequency corresponds to a frequency of occurrence of the keyword corresponding to the WordID. For example, the keyword "Paris" may have a WordID of 8 and a frequency of occurrence of 1002. Thus, the category spectrum includes a pair {8,1002}. Also note that the category spectrum may be visually represented. For example, on a 2D plot, the x-axis may be WordID and the y-axis may be Frequency. At step 98, the classification module 32 then normalizes the frequency of occurrence of the filtered keywords to produce the category spectrum for the category. The category spectrum is normalized so that area under each of the category spectrums is the same. Doing so reduces comparative bias between categories.

Figure 6:
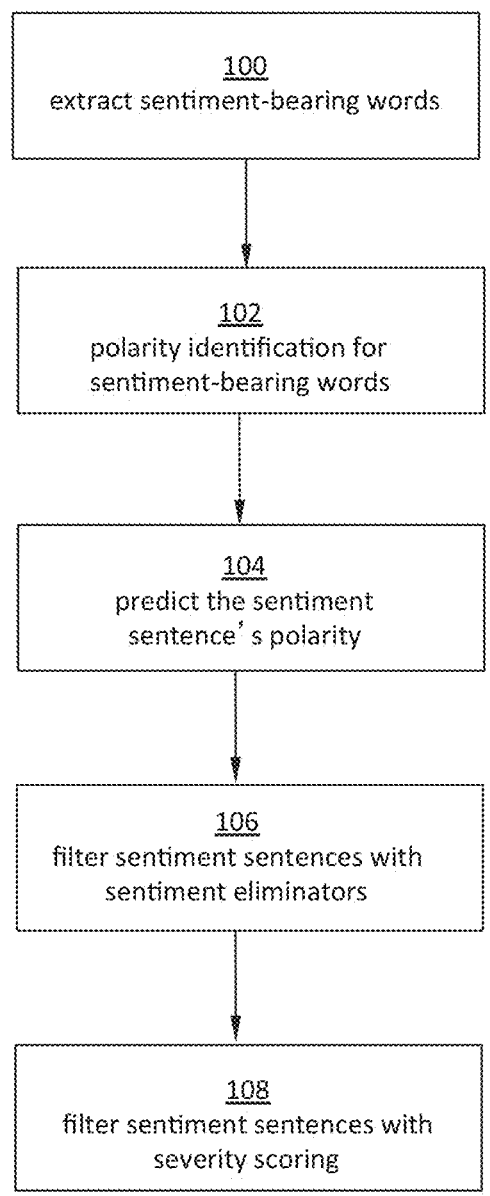
FIG. 6 is a flow diagram illustrating one embodiment of the process in the sentiment engine in accordance with the present invention.

FIG. 6 is a flow diagram illustrating one embodiment of the process in the sentiment engine 22. The polarity prediction module 31 in the sentiment engine 22 is configured to predict the polarities of the individual sentences in a review. Before applying the proposed approach, the reviews should be split into sentences, which are units that are smaller or larger than a sentence. Then these units are processed to identify the categories at step 100. After categories are identified, the sentiment bearing keywords are extracted from the training dataset, which are expanded to a full opinion bearing keywords list as described at step 102. At step 104, the polarity of each sentiment sentence is identified. At step 106, the filtering mechanism is applied to identify sentences that are not actually sentiment bearing sentences but identified as sentiment sentences. At step 108, the severity of the polarity is incorporate in the sentiment sentences. Optionally, the sentiment engine 22 is tuned to make it a customer service sentiment engine.

Sentiment-Bearing Words Extraction

At step 100, after identifying sentiment words, these sentiment words are primarily used to express subjective opinions. Previous work established a positive statistically significant correlation between adjectives and subjectivity of the opinion. Therefore presence of an adjective in a sentence is a strong indication of it being subjective, i.e., sentiment bearing. Accordingly, the built sentiment engine 22 is configured to utilize the adjectives as the sentiment words. Any sentence that classified into a category is then analyzed for the sentiment-bearing keywords. The term "sentiment sentences" refers to sentences that contain at least one product category and one or more sentiment-bearing words.

The following procedure is conducted to extract the sentiment-bearing keywords.

Find Sentiment-Bearing Keywords 1. for each sentence in the review database
1.1. if it contains any category keywords
1.1.1. extract all adjective words of that sentence as the sentiment-bearing keyword. (The adjectives in the sentence are found using the adjectives lexicon we have in our knowledge base.)
1.1.2 the most adjacent adjective to the category keywords are identified as the effective adjectives.

For instance nice is an effective adjective for bed in the following sentiment sentence:

The beds were nice, the sofas and chairs were comfy, and the kitchenette was stocked with the essentials.

Effective adjectives are used to identify orientation of sentiment sentences.

Polarity Identification for Sentiment-Bearing Words

At step 104, after the adjectives are extracted for each sentence with category in the review database, the sentiment engine 22 is configured to identify the orientation of each sentiment bearing word. To accomplish this, a training mechanism is used. The training is done on a subsample of the dataset that is manually tagged with polarity. This manually annotated content is then used to learn the orientation of each sentiment-bearing keywords. After identifying the polarity of each such adjective, the sentiment engine 22 is configured to use a thesaurus to identify the synonyms and antonyms of these adjectives and include them into the sentiment-bearing words list with their polarity for the selected category.

Predicting the Sentiment Sentence's Polarity

At step 104, after the training has occurred, the category keywords and the sentiment-bearing words are used to classify the reviews that are crawled from the web and not in the training dataset. The procedure to find the sentiment sentences is as follows. First for each sentence in the review database, the sentiment engine 22 is configured to identify its category using the trained category keywords. For each of the sentences that contain one or more category list, the sentiment engine 22 is configured to identify if the sentence contains any of the sentiment bearing words in database. If the sentence contains at least one category keyword and one or more sentiment-bearing sentence, that sentence is potentially a sentiment sentence, which is referred as sentiment candidates. After the sentiment candidates are identified, for each adjective and keyword pair in the given sentiment sentence, the sentiment engine 22 is configure to compute the distance between them. If the distance is greater than a predefined threshold, then that sentiment candidate is identified as a sentiment sentence for the category that keyword belongs to. Otherwise, the sentiment candidate is ignored.

If there is a negation keyword before the sentiment-bearing keyword and its distance to the sentiment bearing keyword is less than a pre-determined threshold, then the polarity of the sentiment sentence is used as the opposite of the sentiment-bearing keyword that is used to identify its polarity.

To identify the sentiment sentences polarity, the following situations are considered:

1. A sentiment sentence might contain both likes and dislikes about the most or all of the categories of the product. Then the opinion words are mostly either positive or negative. Furthermore, each opinion word is most likely to be closer in distance to the category keyword it is related to. Therefore, such a sentence can be listed many times for each category with their probabilities. For instance, in the sentence "The stat/was nice, however, the room was very small." nice and small opinion words are both mentioned, here nice corresponds to Customer Service category, while small other corresponds to Room category.

2. Sentiment sentence might contain both likes and dislikes about the same category. For instance in the following sentence, "Rooms are small and clean." The customer is not happy with the size of the room, but happy with the room being quiet. Such sentences must also be captured and reported as both negative and positive.

For a sentence that contains a "but" clause (sub-sentence that starts with but, however, etc.) that indicates sentimental change for the features in the clause, we use the effective opinion in that clause (sub-sentence) to identify the orientation of the categories. However, if there is no category orientation in the sub-sentence, then the polarity of the sub-sentence is identified as the opposite polarity of the sentence.

Filtering of Sentiment Sentences

At step 106, sentiments identified above might contain wishes, thoughts, believes, and etc. about the product. Therefore, the sentiments actually do not reflect the actual opinion on that category of the product. Accordingly, a filtering technique is applied where keywords such as guess, believe, wish are treated as the sentiment eliminators. Any sentiment containing such keywords is eliminated from the sentiment sentences list. A dictionary of such eliminators is provided to the sentiment engine 22.

Filtering of Sentiment Sentences

At step 108, after identifying the degree of feeling, the sentiment engine 22 identifies how strong the feeling is. The severity of the opinion can be measured by associating each adjective with a sentiment score. For instance, the severe degree of polarity for the sentiment bearing keyword "bad" is −1 while the severity for "horrible" is −3. The severity assignment is done as follows. One or more person, or via a computer, will manually identify the severity of each positive or negative sentiment words that are identified as explained at step 102. Final severity scoring is assigned using the scores agreed upon. When there is a disagreement on severity score, then the score that the majority of the annotators agreed.

6. Social Media NPS

Figure 7A:
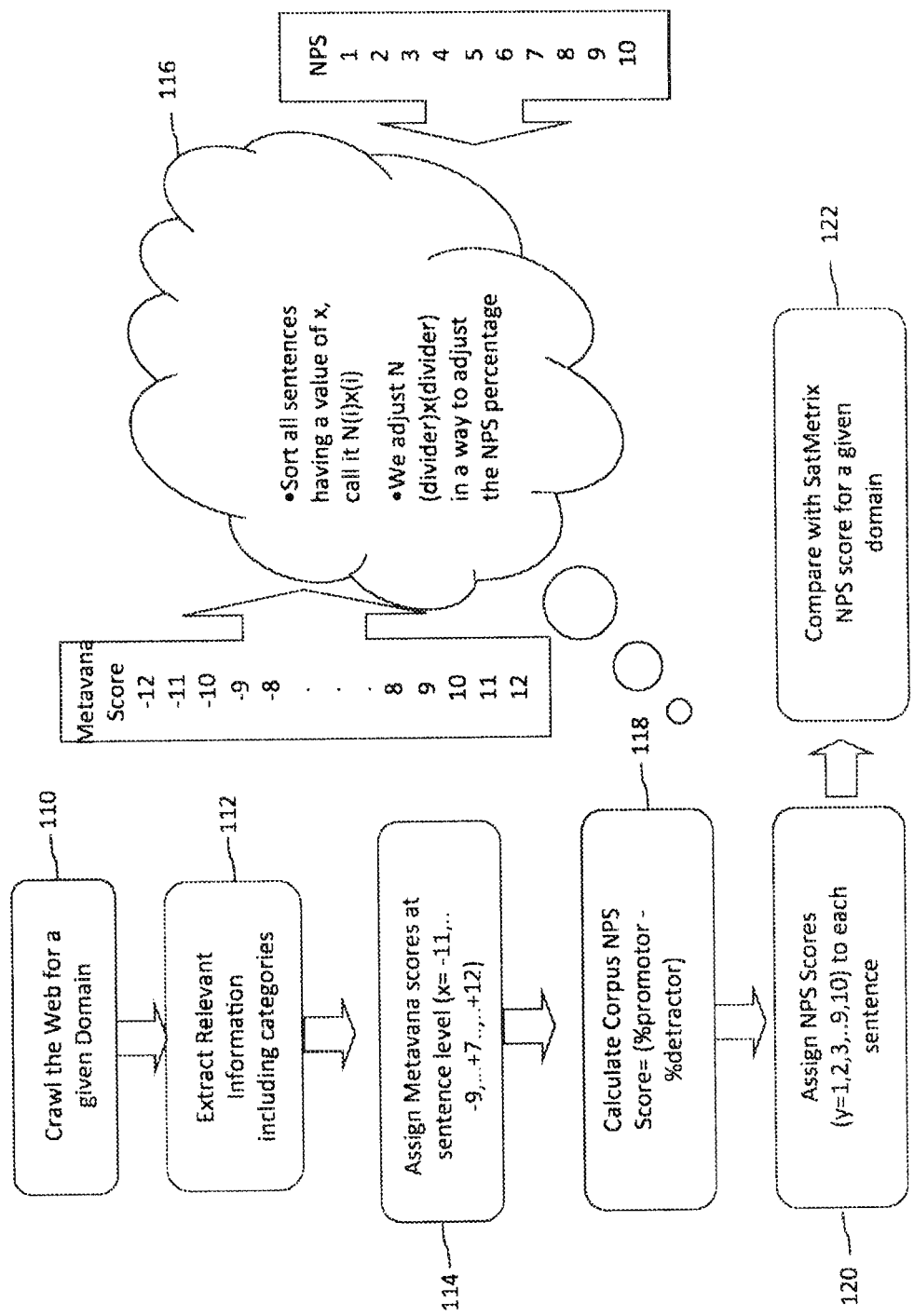
FIG. 7A is a flow diagram illustrating social media net promoter service (SNPS) in accordance with the present invention.

FIG. 7 is a flow diagram illustrating social media net promoter service (SNPS). The general concept of net promoter is both a loyalty metric and a discipline for using customer feedback to fuel profitable growth in one's business. Developed by Satmetrix, Bain & Company, and Fred Reichheld, the concept was first popularized through Reichheld's book *The Ultimate Question*, and has since been embraced by leading companies worldwide as the standard for measuring and improving customer loyalty.

The Net Promoter Score (NPS) is a straightforward metric that holds companies and employees accountable for how they treat customers. Employees at all levels of the organization understand it, opening the door to customer-centric change and improved performance.

Companies follow an associated discipline to actually drive improvements in customer loyalty and enable profitable growth. Companies typically have leadership commitment, and the right business processes and system in place to deliver real-time information to employees so they can act on customer feedback and achieve results.

Figure 7B:
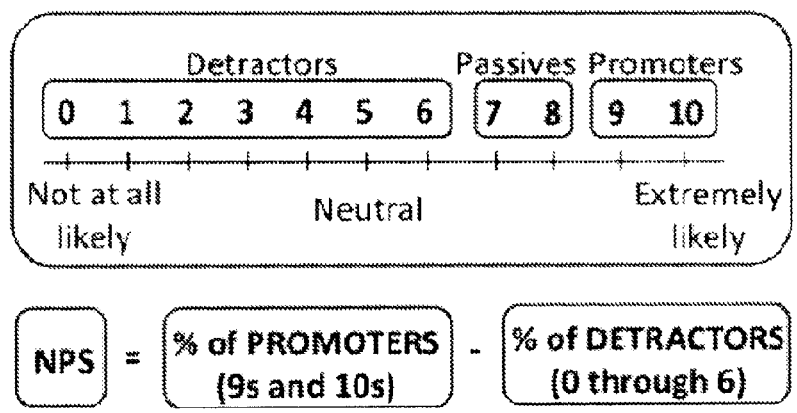
FIG. 7B is a pictorial diagram illustrating an example of the net promoter source in accordance with the present invention.
Figure 8A:
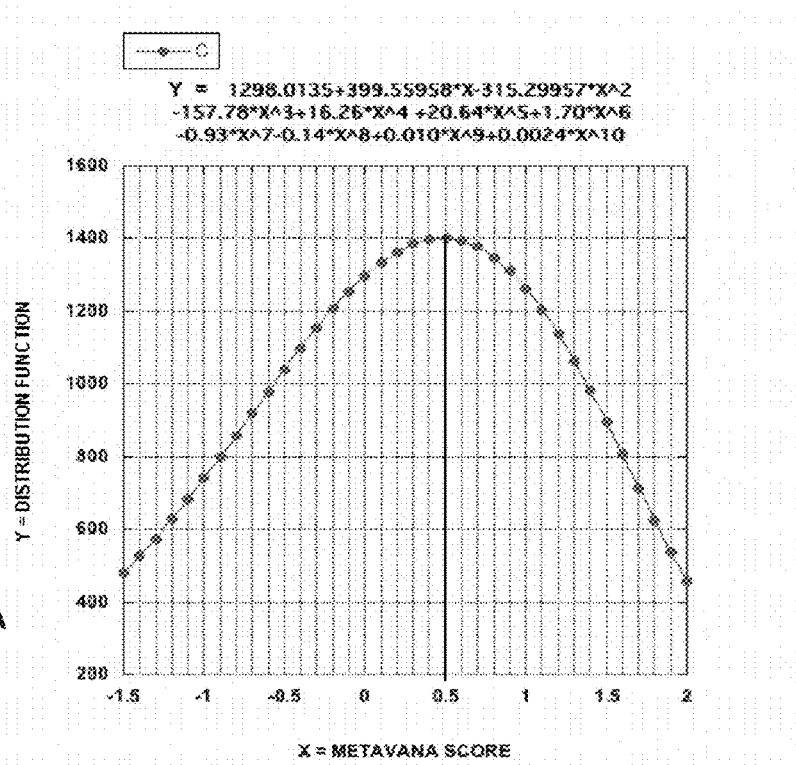
Figure 8B:
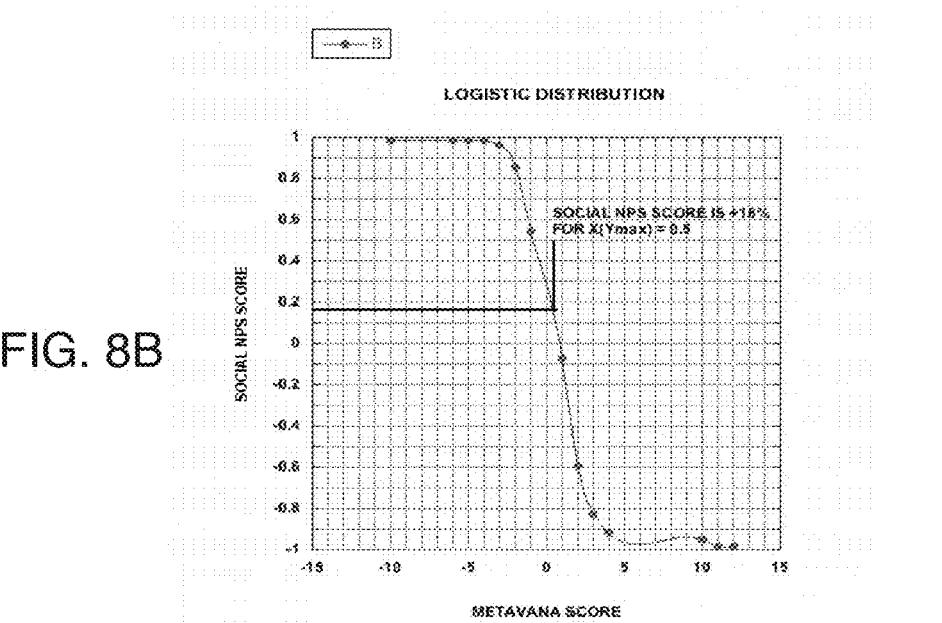
Figure 8C:
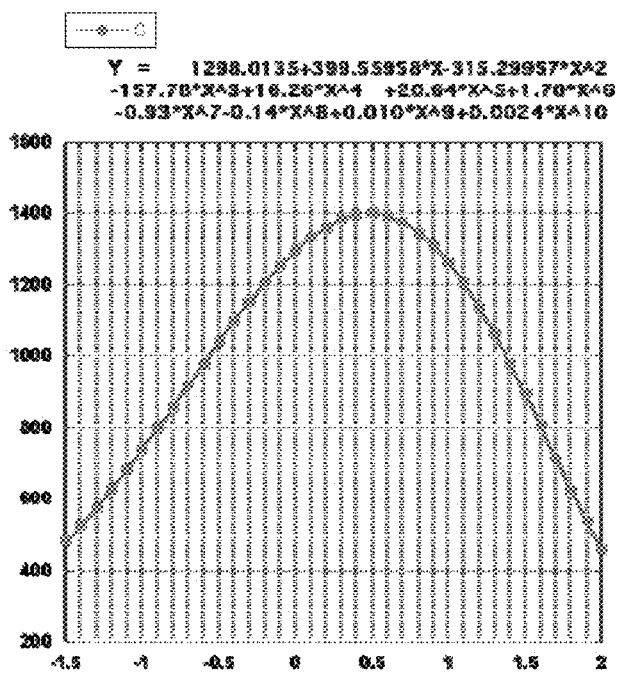
Figure 8D:
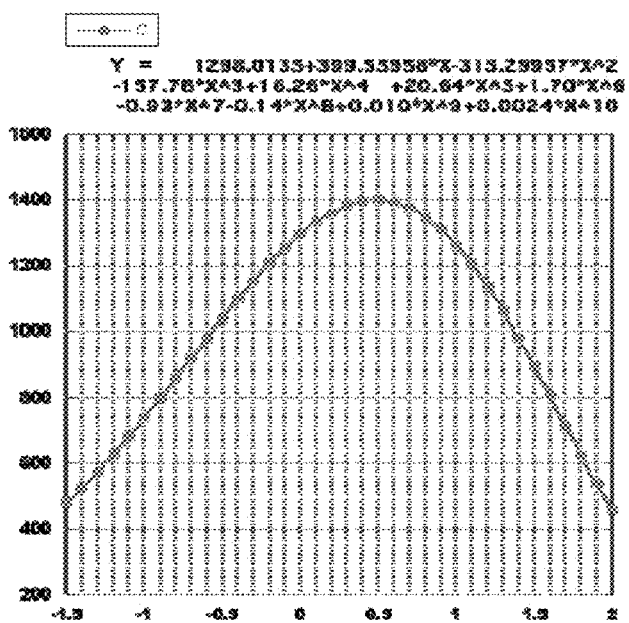
Figure 8G:
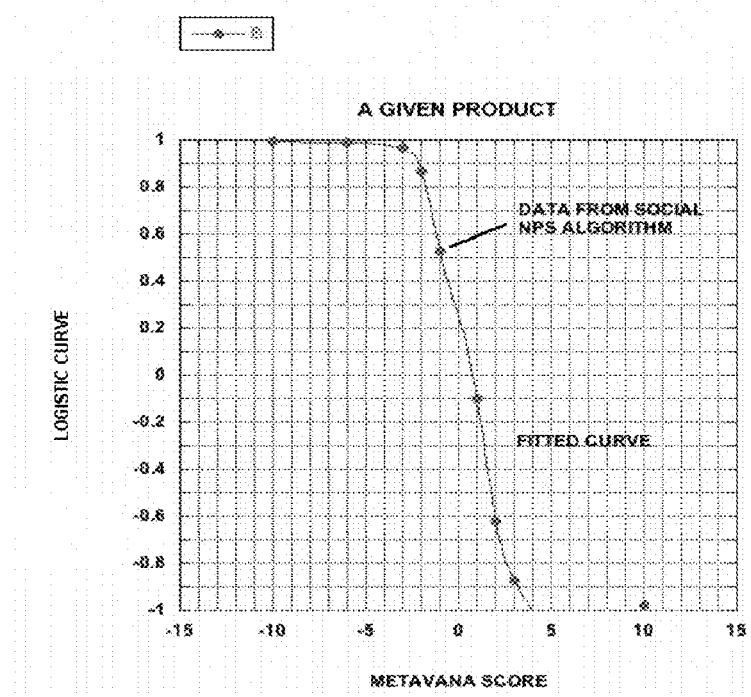

As shown in FIG. 7B, NPS is based on the fundamental perspective that every company's customers can be generally divided into three categories: Promoters, Passives, and Detractors. By asking one simple question—How likely is it that you would recommend [Company X] to a friend or colleague? You are able to track these groups and get a clear measure of your company's performance through its customers' eyes. Customers respond on a 0-to-10 point rating scale and are categorized as follows:

Promoters (score 9-10) are loyal enthusiasts who will keep buying and refer others, fueling growth.

Passives (score 7-8) are satisfied but unenthusiastic customers who are vulnerable to competitive offerings.

Detractors (score 0-6) are unhappy customers who can damage your brand and impede growth through negative word-of-mouth.

To calculate your company's Net Promoter Score (NPS), take the percentage of customers who are Promoters and subtract the percentage who are Detractors.

In one embodiment, at step 110, the crawling module 26 is configured to crawl the web as much as possible on a number of brands recommended by various sources, including from Dr. Brooks and a SNPS provider, such as Metavana. At step 112, the filtering module 30 is configured to extract relevant information, such as categories. At step 114, the sentiment engine 22 is configured to assign scores ($x=-11, \ldots -9, \ldots +7, \ldots +12$) from a first source, such as Metavana, to each sentence, e.g., there are twenty-four sentences.

In one embodiment, at step 116, the sentiment engine 22 has scores that spans from −ScoreMin to +ScoreMax. All sentences are sorted having a certain value of x, call the number $N(i)$, $$N(1) \times (1)\ N(2) \times (2)\ N(3) \times (3) \ldots N(23) \times (34)\ N(24) \times (24)$$

A value of $N(divider) \times (divider)$ is computed as follows:

$N(divider) \times (divider)$ is adjusted in such a way to obtain Satmetrix score of 17% for Eircom. Knowing the value of $N(divider) \times (divider)$, the function in step 116 can be performed from data of step 114.

At step 118, the sentiment engine 22 is configured to calculate Corpus NPS Score (% promotor−% detractor). To phrase it another way, the term (% promoters−% detractors) =NPS score which is now called Corpus NPS Scores (for example −17% for Eircom).

For example, Eircom Dataset is taken as a Training Set.

1. Providing a full file for Eircom data of 13K records having NPS number. NPS score is −26.1%

2. Only 10K line having both sentence and NPS number. NPS score is −24.5%

3. Only 7K sentences pass the sentiment engine 22 which exclude sentence that are ambiguous, such as "wow", "can't tell" and statements.

4. The 7K sentences is processed as if the task is to sample the data, which results in NPS score of −24.0%.

At step 120, the sentiment engine 22 assigns NPS scores ($y=1, 2, 3 \ldots 9, 10$) to each sentence. At step 122, the sentiment engine 22 is configured to compare with SatMetrix NPS score for a given domain.

Optionally, in some embodiments, the decision brain of neural network (or neural net) is implemented with logistic curve.

Illustrations of sampling graph curves of scores and logistic distributions are shown in FIGS. 8A-G.

FIG. 9 depicts a block diagram of a machine in the example form of a computer system 124 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computer system 124 includes a processor 1002 (e.g., a central processing unit (CPU), a graphics processing unit (GPU) or both), and memory 128, which communicate with each other via bus 132. Memory 128 includes volatile memory devices (e.g., DRAM, SRAM, DDR RAM, or other volatile solid state memory devices), non-volatile memory devices (e.g., magnetic disk memory devices, optical disk memory devices, flash memory devices, tape drives, or other non-volatile solid state memory devices), or a combination thereof. Memory 128 may optionally include one or more storage devices remotely located from the computer system 124. The computer system 124 may further include video display unit 130 (e.g., a plasma display, a liquid crystal display (LCD) or a cathode ray tube (CRT)). The computer system 124 also includes input devices 134 (e.g., keyboard, mouse, trackball, touchscreen display, etc.), output devices 136 (e.g., speakers), and a network interface device 138. The aforementioned components of the computer system 124 may be located within a single housing or case (e.g., as depicted by the dashed lines in FIG. 10). Alternatively, a subset of the components may be located outside of the housing. For example, the video display unit 130, the input devices 134, and the output device 136 may exist outside of the housing, but be coupled to the bus 132 via external ports or connectors accessible on the outside of the housing.

Memory 128 includes a machine-readable medium 140 on which is stored one or more sets of data structures and instructions 144 (e.g., software) embodying or utilized by any one or more of the methodologies or functions described herein. The one or more sets of data structures may store data. Note that a machine-readable medium refers to a storage medium that is readable by a machine (e.g., a computer-readable storage medium). The data structures and instructions 144 may also reside, completely or at least partially, within memory 128 and/or within the processor 1002 during execution thereof by computer system 124, with memory 128 and processor 1002 also constituting machine-readable, tangible media.

The data structures and instructions 144 may further be transmitted or received over a network 10 via network interface device 138 utilizing any one of a number of well-known transfer protocols (e.g., HyperText Transfer Protocol (HTTP)). Network 10 can generally include any type of wired or wireless communication channel capable of coupling together computing nodes (e.g., the computer system 124). This includes, but is not limited to, a local area network, a wide area network, or a combination of networks. In some embodiments, network 10 includes the Internet.

Certain embodiments are described herein as including logic or a number of components, modules, or mechanisms. Modules may constitute either software modules (e.g., code and/or instructions embodied on a machine-readable medium or in a transmission signal) or hardware modules. A hardware module is a tangible unit capable of performing certain operations and may be configured or arranged in a certain manner. In example embodiments, one or more computer systems (e.g., the computer system 124) or one or more hardware modules of a computer system (e.g., a processor 126 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 126 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 126 configured using software, the general-purpose processor 126 may be configured as respective different hardware modules at different times. Software may accordingly configure a processor 126, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 126 that are temporarily configured (e.g., by software, code, and/or instructions stored in a machine-readable medium) or permanently configured to perform the relevant operations. Whether temporarily or permanently configured, such processors 126 may constitute processor-implemented (or computer-implemented) modules that operate to perform one or more operations or functions. The modules referred to herein may, in some example embodiments, comprise processor-implemented (or computer-implemented) modules.

Moreover, the methods described herein may be at least partially processor-implemented (or computer-implemented) and/or processor-executable (or computer-executable). For example, at least some of the operations of a method may be performed by one or more processors 126 or processor-implemented (or computer-implemented) modules. Similarly, at least some of the operations of a method may be governed by instructions that are stored in a computer readable storage medium and executed by one or more processors 126 or processor-implemented (or computer-implemented) modules. The performance of certain of the operations may be distributed among the one or more processors 126, not only residing within a single machine, but deployed across a number of machines. In some example embodiments, the processors 126 may be located in a single location (e.g., within a home environment, an office environment or as a server farm), while in other embodiments the processors 126 may be distributed across a number of locations.

While the embodiment(s) is (are) described with reference to various implementations and exploitations, it will be understood that these embodiments are illustrative and that the scope of the embodiment(s) is not limited to them. In general, the embodiments described herein may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and its practical applications, to thereby enable others skilled in the art to best utilize the embodiments and various embodiments with various modifications as are suited to the particular use contemplated

What is claimed is:

1. A computer-implemented method for sentiment analysis from social media content, comprising:

performing by at least one processor the steps of:
  crawling a plurality of websites to obtain metadata from social media content;
  extracting the metadata from the social media content by identifying at least one sentiment-bearing keyword and a polarity thereof in a sentence from the social media content;
  determining at least one category corresponding to the at least one sentiment-bearing keyword of the sentence; and
  determining at least one sentiment corresponding to the at least one category based on the at least one sentiment-bearing keyword,
wherein,
  the method comprises the step of extracting a list of keywords from a plurality of documents, the step of extracting the list of keywords including:
    (a) extracting keywords from each document of the plurality of documents, and
  for each keyword,
    (b) for each keyword,
      calculating a frequency, f, of the keyword in the plurality of documents and a number of documents, N, that include the keyword,
      using a phase transition formula to calculate a relevancy of the keyword based on the frequency of the keyword in the plurality of documents and the number of documents that include the keyword, and
      adding the keyword to the list of keywords when the relevancy of the keyword exceeds a predetermined threshold.

2. The method of claim 1, wherein the step of extracting includes filtering the at least one sentiment-bearing keyword with sentiment eliminators.

3. The method claim 1, wherein the step of extracting includes filtering the at least one sentiment-bearing keyword by associating with a sentiment score.

4. The method of claim 1, wherein the phase transition formula is:

$$\frac{f}{N^x},$$

wherein $x \geq 1$.

5. The method of claim 1, wherein prior to the step of determining at least one category, the method further comprises the step of generating a list of categories by:
  determining pairs of keywords in the list of keywords that are related to each other, the pairs of keywords being unique pairs of keywords,
  identifying sets of the pairs of the keywords in which each set includes at least one keyword that is common to all of the pairs of keywords in the set, and
  until a predetermined termination condition is achieved, iteratively combining the sets of the pairs of keywords in which each combined set includes at least one keyword that is common to all of the pairs of keywords in the combined set.

6. The method of claim 1, wherein the step of determining at least one category includes using a neural network to determine the at least one category corresponding to the at least one sentiment-bearing keyword of the sentence.

7. The method of claim 1, wherein the at least one sentiment is an expression of an opinion relating to the at least one category.

8. The method of claim 1, wherein the at least one category is associated with a product.

9. The method of claim 1, wherein the at least one category is associated with a service.

10. A computer-implemented method for sentiment analysis from social media content, comprising:
performing by at least one processor the steps of:
  crawling a plurality of websites to obtain metadata from social media content;
  extracting the metadata from the social media content by identifying at least one sentiment-bearing keyword and a polarity thereof in a sentence from the social media content;
  determining at least one category corresponding to the at least one sentiment-bearing keyword of the sentence; and
  determining at least one sentiment corresponding to the at least one category based on the at least one sentiment-bearing keyword,
wherein,
  the step of determining at least one category includes:
    (a) obtaining a plurality of category spectrums, a respective category spectrum including a frequency of occurrence of keywords in a list of keywords that corresponds to a respective category,
    (b) determining a category spectrum for the sentence based on at least one keyword,
    (c) calculating dot products of the category spectrum for the sentence and each category spectrum in the plurality of category spectrums, and
    (d) determining the at least one category as a category corresponding to at least one dot product that exceeds a predetermined threshold.

11. The method of claim 10, wherein prior to obtaining the plurality of category spectrums, the method further comprises for each category, determining a category spectrum for the category by:
  obtaining a corpus of documents corresponding to the category,
  extracting keywords from each document in the corpus of documents,
  filtering the keywords using a phase transition formula to produce filtered keywords,
  determining a frequency of occurrence of the filtered keywords in the corpus of documents, and
  normalizing the frequency of occurrence of the filtered keywords to produce the category spectrum for the category.

12. A system comprising:
at least one processor;
memory; and
at least one program stored in the memory and executable by the at least one processor, the at least one program comprising instructions to:
  crawl a plurality of websites to obtain metadata from social media content,
  extract the metadata from the social media content by identifying at least one sentiment-bearing keyword and a polarity thereof in a sentence from the social media content,
  determine at least one category corresponding to the at least one sentiment-bearing keyword of the sentence, and determine at least one sentiment corresponding to the at least one category based on the at least one sentiment-bearing keyword, wherein, the instructions further include instructions to extract a list of keywords from a plurality of documents, the instructions to extract the list of keywords including instructions to:

(a) extract keywords from each document of the plurality of documents, and (b) for each keyword, calculate a frequency, f, of the keyword in the plurality of documents and a number of documents, N, that include the keyword, use a phase transition formula to calculate a relevancy of the keyword based on the frequency of the keyword in the plurality of documents and the number of documents that include the keyword, and add the keyword to the list of keywords when the relevancy of the keyword exceeds a predetermined threshold.

13. The system of claim 12, wherein the phase transition formula is:

$$\frac{f}{N^x},$$

wherein $x \geq 1$.

14. A non-transitory computer readable storage medium storing at least one program configured for execution by a computer, the at least one program comprising instructions to:

crawl a plurality of websites to obtain metadata from social media content;

extract the metadata from the social media content by identifying at least one sentiment-bearing keyword and a polarity thereof in a sentence from the social media content;

determine at least one category corresponding to the at least one sentiment-bearing keyword of the sentence; and determine at least one sentiment corresponding to the at least one category based on the at least one sentiment-bearing keyword, wherein, the instructions further include instructions to extract a list of keywords from a plurality of documents, the instructions to extract the list of keywords including instructions to:

(a) extract keywords from each document of the plurality of documents, and (b) for each keyword, calculate a frequency, f, of the keyword in the plurality of documents and a number of documents, N, that include the keyword, use a phase transition formula to calculate a relevancy of the keyword based on the frequency of the keyword in the plurality of documents and the number of documents that include the keyword, and add the keyword to the list of keywords when the relevancy of the keyword exceeds a predetermined threshold.

15. A system, comprising:

at least one processor;

memory; and at least one program stored in the memory and executable by the at least one processor, the at least one program comprising instructions to:

crawl a plurality of websites to obtain metadata from social media content, extract the metadata from the social media content by identifying at least one sentiment-bearing keyword and a polarity thereof in a sentence from the social media content, determine at least one category corresponding to the at least one sentiment-bearing keyword of the sentence, and determine at least one sentiment corresponding to the at least one category based on the at least one sentiment-bearing keyword, wherein, the instructions to determine at least one category include instructions to:

(a) obtain a plurality of category spectrums, a respective category spectrum including a frequency of occurrence of keywords in a list of keywords that corresponds to a respective category, (b) determine a category spectrum for the sentence based on at least one keyword, (c) calculate dot products of the category spectrum for the sentence and each category spectrum in the plurality of category spectrums, and (d) determine the at least one category as a category corresponding to at least one dot product that exceeds a predetermined threshold.

16. A non-transitory computer readable storage medium storing at least one program configured for execution by a computer, the at least one program comprising instructions to:

crawl a plurality of websites to obtain metadata from social media content;

extract the metadata from the social media content by identifying at least one sentiment-bearing keyword and a polarity thereof in a sentence from the social media content;

determine at least one category corresponding to the at least one sentiment-bearing keyword of the sentence; and determine at least one sentiment corresponding to the at least one category based on the at least one sentiment-bearing keyword, wherein, the instructions to determine at least one category include instructions to:

(a) obtain a plurality of category spectrums, a respective category spectrum including a frequency of occurrence of keywords in a list of keywords that corresponds to a respective category, (b) determine a category spectrum for the sentence based on at least one keyword, (c) calculate dot products of the category spectrum for the sentence and each category spectrum in the plurality of category spectrums, and (d) determine the at least one category as a category corresponding to at least one dot product that exceeds a predetermined threshold.

* * * * *